US012766851B2

(12) United States Patent
Gulvin et al.

(10) Patent No.: US 12,766,851 B2
(45) Date of Patent: Oct. 20, 2026

(54) MARKING SYSTEM WITH BYPASS TUBE

(71) Applicant: Xerox Corporation, Norwalk, CT (US)

(72) Inventors: Peter Gulvin, Webster, NY (US); Travis Burt, Canandaigua, NY (US); Christine A. Steurrys, Williamson, NY (US); Steven R. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 18/918,664

(22) Filed: Oct. 17, 2024

(65) Prior Publication Data

US 2026/0109151 A1 Apr. 23, 2026

(51) Int. Cl.

| | |
|---|---|
| ***B41J 2/19*** | (2006.01) |
| ***B41J 2/045*** | (2006.01) |
| ***B41J 2/165*** | (2006.01) |
| ***B41J 2/175*** | (2006.01) |
| ***B41J 2/185*** | (2006.01) |

(52) U.S. Cl.

CPC ............... *B41J 2/19* (2013.01); *B41J 2/0451* (2013.01); *B41J 2/16579* (2013.01); *B41J 2/17596* (2013.01); *B41J 2/185* (2013.01); *B41J 2/16526* (2013.01); *B41J 2002/1856* (2013.01)

(58) Field of Classification Search

CPC ........ B41J 2/19; B41J 2/0451; B41J 2/16579; B41J 2/17596; B41J 2/185; B41J 2/16526; B41J 2002/1856

See application file for complete search history.

(56) References Cited

U.S. PATENT DOCUMENTS

| | | | | |
|---|---|---|---|---|
| 8,622,513 | B2 | 1/2014 | Steurrys et al. | |
| 9,039,141 | B2 | 5/2015 | Stephens et al. | |
| 9,248,645 | B1 | 2/2016 | Mandel et al. | |
| 10,046,558 | B1 | 8/2018 | Darling | |
| 10,500,846 | B1 | 12/2019 | Knierim | |
| 2012/0293592 | A1* | 11/2012 | Hibbard | B41J 2/18 347/92 |
| 2014/0104348 | A1 | 4/2014 | Owaki et al. | |
| 2015/0314607 | A1* | 11/2015 | Moriguchi | B41J 2/18 347/85 |
| 2020/0324341 | A1 | 10/2020 | Liu et al. | |

FOREIGN PATENT DOCUMENTS

| | | | | |
|---|---|---|---|---|
| EP | 1658978 | A1 * | 5/2006 | B41J 2/1409 |
| WO | WO-2022019883 | A1 * | 1/2022 | B41J 2/1707 |

* cited by examiner

*Primary Examiner* — Justin Seo

(74) *Attorney, Agent, or Firm* — Fox Rothschild LLP

(57) ABSTRACT

A marking system of a printer incorporates a bypass tube in its ink supply system to enable ink to bypass a pump during a drool process that removes air bubbles from a printhead. The bypass tube includes a valve that is opened during the drool operation and closed during normal operation of the marking system.

18 Claims, 4 Drawing Sheets

MARKING SYSTEM WITH BYPASS TUBE

FIELD OF THE DISCLOSURE

The present disclosure relates to a marking system. More specifically, the present disclosure relates to a marking system having a bypass tube for removing contaminants.

BACKGROUND

Printheads are critical components in various printers such as inkjet and thermal printers. Printheads include an arrangement of nozzles which eject ink. The functionality and number of nozzles affect the resolution and quality of the print. Additionally, printheads include pressure generating devices that cause the ink to be ejected from the nozzles. Example pressure generators include piezoelectric crystals, heating elements or similar devices.

Printheads additionally include or are associated with ink delivery systems, ink tubes, pumps, valves, and other various components to create printed products. A common issue with printheads occurs with nozzles not firing properly. This is a particular problem in inkjet printers, which can have a faceplate with hundreds or even thousands of tiny orifices (i.e., nozzles) through which ink is ejected. Due to the vast number of nozzles, small contaminants such as air bubbles can create issues, causing a nozzle to become blocked and fail to eject ink, which is a phenomenon sometimes referred to as a "missing" nozzle condition.

Typically, missing nozzles can be compensated for via software and other control systems. However, if the issues persist and more nozzles are affected, issues with resolution and quality of images can occur. A service technician is typically required to disassemble the printer and components of the printhead ink delivery system to resolve such issues. However, this is a time-consuming and tedious process that requires disassembling the printer and the pumps contained in the ink delivery system. In some cases, flushing ink through the printhead can remove contaminants especially when the contaminants include air bubbles, but typically only if the bubbles are very small.

The present disclosure relates to improvements that address at least some of the limitations and issues described above.

SUMMARY

The present disclosure is related to removing contaminants such as air bubbles from marking systems in a time and cost-effective manner, The disclosure provides a marking system that includes a printhead. The printhead includes a plurality of nozzles configured to eject ink. The marking system additionally includes a fluid supply system configured to supply the ink to the printhead. The fluid supply system includes an ink pump that is fluidly connected to one or more conduit segments and configured to transport the ink toward the printhead via the one or more conduit segments. The fluid supply system additionally includes a bypass tube that is fluidly coupled to an inlet of the ink pump and an outlet of the ink pump and a valve that is connected to the bypass tube and configured to transport ink through the bypass tube when open, and not transport ink through the bypass tube when closed. The marking system includes a control system configured to open the valve to transport the ink through the bypass tube instead of the ink pump in response to detection of a missing nozzle condition in the printhead and allow the ink to drool through the nozzles of the printhead and absorb air bubbles as the ink drools.

The present disclosure additionally relates to a method of removing gas from ink delivered to a printhead. The method includes providing a marking system. The marking system includes a printhead, a control system, and a fluid supply system. The fluid supply system includes an ink pump fluidly connected to one or more conduit segments and configured to transport the ink toward the printhead via the one or more conduit segments. The fluid supply system additionally includes a bypass tube fluidly coupled to an inlet of the ink pump and an outlet of the ink pump, and a valve that is connected to the bypass tube and configured to transport ink through the bypass tube when open, and not transport ink through the bypass tube when closed. The control system, in response to the control system detecting a missing nozzle condition in the printhead or by receiving a command from an operator, causes the valve to open. Opening the valve allows the ink to pass through the bypass tube and the ink to drool through the nozzles of the printhead and absorb air bubbles as the ink drools.

DETAILED DESCRIPTION

In the various embodiments, the devices, methods and systems of the present disclosure relate to marking systems of printers that include printheads. Specifically, the present disclosure relates to methods, systems, and parts of printheads and ink delivery systems. As discussed above, a common issue occurs with nozzles of printheads and contaminants affecting nozzles. For example, air bubbles can clog ink delivery systems blocking nozzles and affecting print quality (e.g., streaks and lines, color inconsistencies, increased ink usage, etc.). Moreover, such issues often require a service technician which can be time consuming and, in some cases, costly. The present disclosure relates to a marking system with improved components and systems for rejuvenating missing jets.

As discussed herein, the term marking system refers to the elements of a printer that deliver ink to a substrate, including the printhead(s) and components that deliver ink to the printhead(s). A printer may include an outer housing that stores the marking system and includes a user interface which allows a user to interact with the system. Color printers typically have multiple printheads. As housings and user interfaces of printers are well known, the present disclosure mainly focuses on marking systems and improvements thereof.

Figure 1:
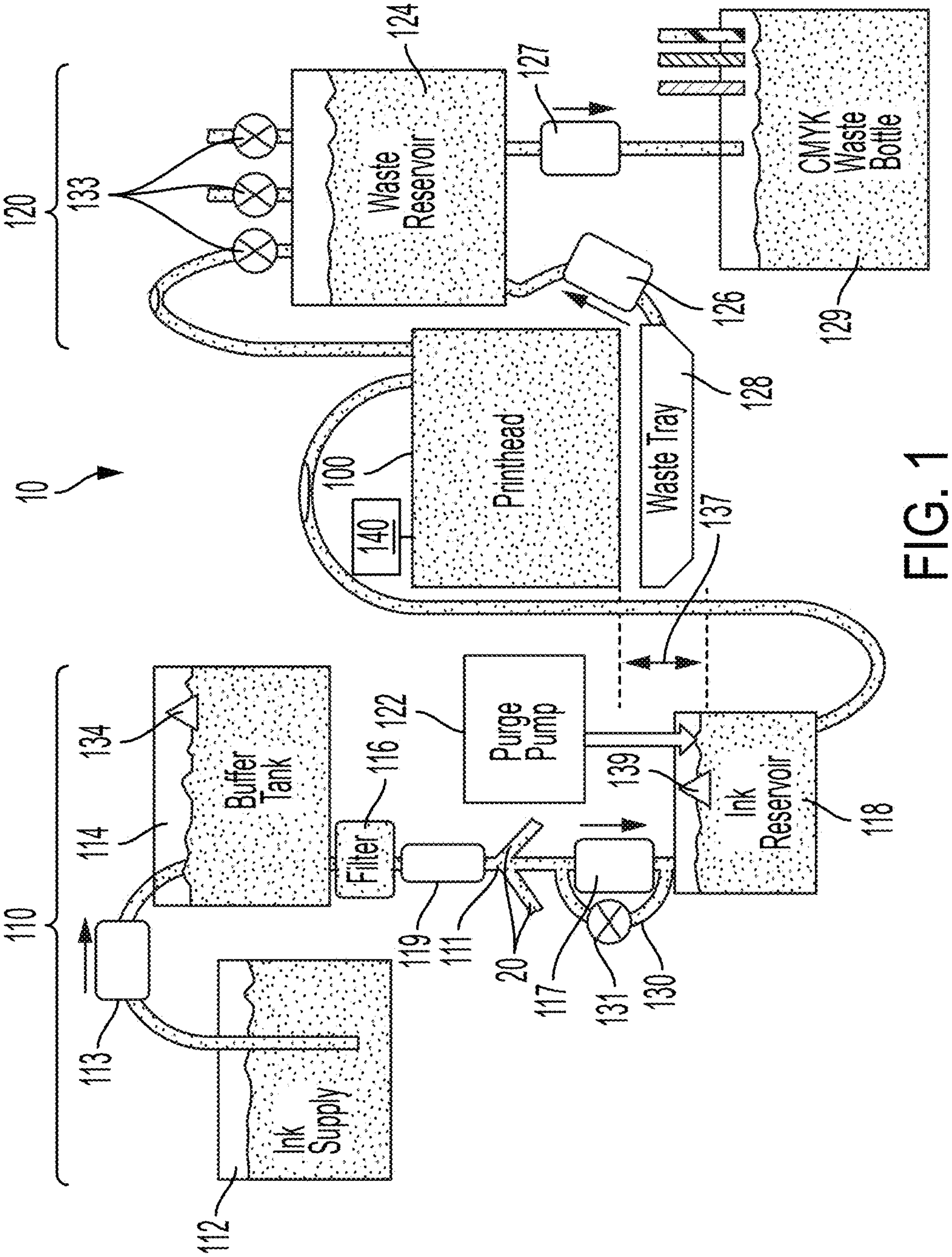
FIG. 1 is a diagram of a marking system in accordance with the principles of the present disclosure.

Referring to FIG. 1, elements of a marking system 10 are depicted. The marking system includes a printhead 100, a fluid supply system 110, and a waste system 120. The printhead 100 includes hundreds, and in some cases, thousands of small nozzles that are responsible for ejecting ink and creating images on the surface of a medium. The fluid supply system 110 provides ink from one or more ink sources to the printhead 100. The waste system 120 manages and removes excess ink, debris and contaminants from the printhead 100. The marking system 10 also includes a control system 140. The control system 140 includes a microcontroller or processor with embedded software and/or a memory containing software that is configured to enable the control system 140 to control the operations of the marking system 10 and the components thereof.

In operation, purge cycles can purge ink through the printhead 100, after which ink is collected via the waste system 120. This process can help extend the life of the marking system 10 and help to prevent clogs in the printhead 100. However, purge cycles, in some cases, are unable to prevent or remove all clogs, and additional procedures are often required. As discussed above, contaminants can be costly and time consuming.

To address this, this document describes a system and process in which ink may be drooled through the printhead nozzles to remove air from the fluid supply system 110. In particular, degassed ink is drooled through the printhead nozzles at volumetric flow rates and/or pressures that are much less than those used in a typical purge process. This can allow air bubbles to slowly dissolve into the degassed ink and be removed. In some cases, especially when larger air bubbles are causing clogs, flushing ink through the nozzles slowly by drooling can be especially beneficial.

With continued reference to FIG. 1, the fluid supply system 110 includes an ink supply 112, a buffer tank 114, a filter 116 and degasser 119, and an ink reservoir 118. The fluid supply system 110 additionally includes a first ink supply pump 113 and a second ink supply pump 117. The first ink supply pump 113 is positioned in a conduit between the ink supply 112 and buffer tank 114, and during operation it is configured to draw and transport ink from the ink supply 112 to the buffer tank 114. The second ink supply pump 117 is positioned in a conduit 111 between buffer tank 114 and the ink reservoir 118, and it is positioned to draw and transport ink from the buffer tank 114, through the filter 116 and degasser 119, to the ink reservoir 118.

In some embodiments, the buffer tank 114 is the main ink source during use of the marking system 10. It holds ink that is available for immediate use by the printhead 100. The buffer tank 114 may include an ink level detection sensor 134 that can determine whether the marking system 10 requires more ink for proper operation. For example, the ink level detection sensor 134 may include floats, optical sensors, electrical resistance sensors, pressure sensors, or other suitable mechanisms.

In some embodiments, the buffer tank 114 includes separate containers which hold different ink colors. Similarly, multiple ink supplies 112 of different colors may be provided, and multiple ink reservoir 118 compartments may be included. To simplify the system, a single conduit and a single pump are depicted as fluidly interconnecting these elements. However, in practice multiple branches may connect these elements. For example, several branches 20 of conduit 111 may lead various colors of ink out of the tank 114 is attached to separate branches 20. The branches 20 may lead to other ink pumps, ink reservoirs and components discussed hereinafter. For example, in some embodiments, the buffer tank 114 may fluidly be attached to three branches 20 with separate ink pumps, and printheads that make up a marking system. It will be appreciated that there may be more, or fewer, branches 20 in the system and connected to the same or different printheads 100 to form the marking system 10.

The ink supply 112 may be a bottle, a tank, cartridge, ink stick, or other container, typically of a size larger than the size of a corresponding container of the buffer tank 114, to provide a reserve of ink that is used to replenish ink levels in the buffer tank 114 which the levels are below a threshold. In some embodiments that are high volume systems, the ink supply 112 may include a continuous ink supply system with one or more in tanks that are positioned outside of the marking system 10. In some embodiments, when the ink level sensor 134 determines that the buffer tank 114 is low on ink. When the buffer tank 114 is low on ink, the ink supply 112 may be switched to a full ink supply without stopping operation of the marking system 10 as the buffer tank 114 is separate from the ink supply 112.

As discussed above, the buffer tank 114 is fluidly attached to a filter 116 and/or degasser 119 that are positioned to filter and degas the ink before the ink reaches the ink reservoir 118. As depicted, the filter 116 and degasser 119 are arranged prior to (i.e., upstream of) fluid traveling through the second ink supply pump 117 and various branches 20. It will be appreciated that the filter 116 and degasser 119 may be positioned at other locations in the conduit, such as after (i.e., downstream of) the second ink supply pump 117. The filter 116 is configured to remove impurities from the ink prior to the ink reaching ink reservoir 118 and the printhead 100. The filter 116 may be a membrane filter, a fibrous filter, a mesh filter, or a different type of appropriate filter for removing impurities. In some embodiments, the degasser 119 may be configured as a membrane that allows air particles to be pulled through while routing the ink towards the ink reservoir 118. The degasser 119 may also remove other dissolved gases or undissolved gases from the ink prior to the ink reaching the printhead 100. As discussed above, the degasser 119 may be a membrane degasser in some embodiments. In other embodiments, the degasser 119 may also be a vacuum degasser, an ultrasonic degasser, or other degasser.

The ink moves fluidly through the ink delivery system 110 through the second ink supply pump 117. The second ink supply pump 117 fills the ink reservoir 118. The top of the volume of ink in reservoir 118 is positioned below the face of the printhead 100, thus applying a negative pressure at the print head nozzles. A negative pressure is required to form a meniscus (e.g., a curved surface of liquid ink at the opening of the printhead) in the nozzle, which prevents the nozzles from drooling ink during normal operation.

Figure 2:
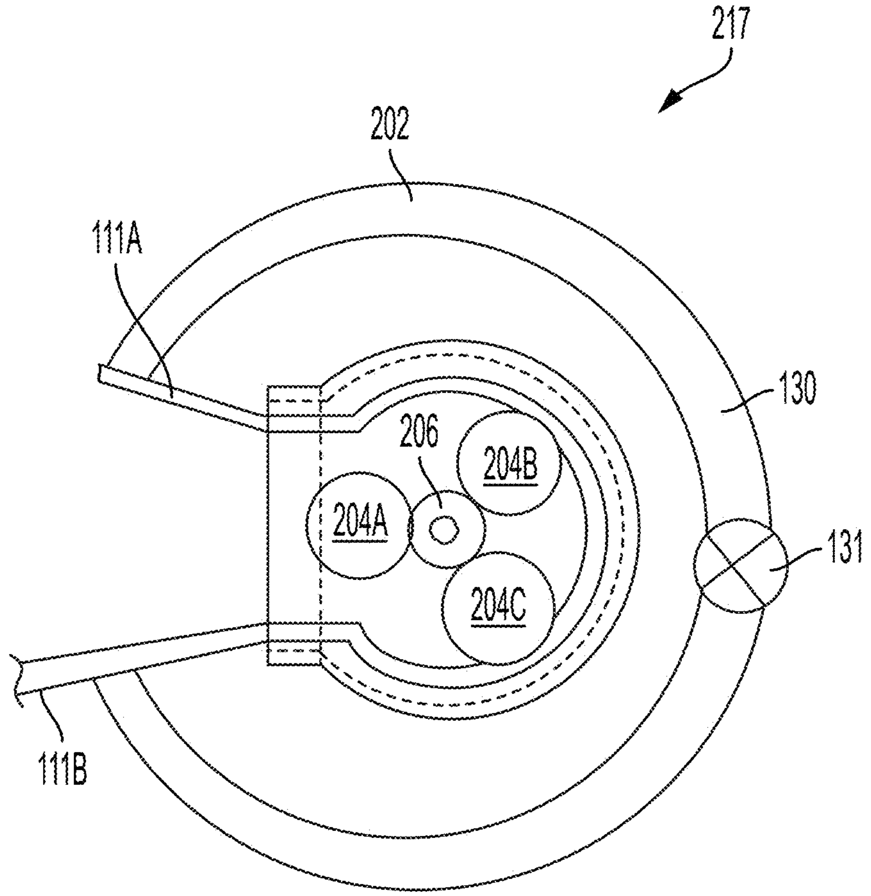
FIG. 2 illustrates elements of an ink pump that may be used in the marking system of FIG. 1.

In some embodiments, one or more of the ink supply pumps (such as second ink supply pump 117) may be a peristaltic pump. Referring to FIG. 2, a schematic diagram of a peristaltic pump 217 is shown. The peristaltic pump 217 includes a housing 202, rollers 204A-204C, and a rotor 206 which the rollers 204A-204C rotate about. FIG. 2 also depicts a first conduit segment 111A transporting ink from the buffer tank (114 in FIG. 1) to the peristaltic pump 217 and second conduit segment 111B extending out of the peristaltic pump 217 towards the ink reservoir 118. Each of the conduit segments 111A, 111B is configured as a malleable tubing that resiliently deforms. Ink transports from the first conduit segment 111A to second conduit segment 111B through positive pressure generated by the rollers 204A-204C deforming the tubing and creating kinks as the rollers 204A-204C rotate about the rotor 206. In this manner, ink is transported through the pump 217 as the rotor 206 rotates the rollers and kinks the tubing when rotor 206 seizes movement. In this manner, the peristaltic pump 217 acts as a point where ink stops flowing when not in use. Although a peristaltic pump is shown by way of illustration, other pumps may also be used such as diaphragm pumps, piston pumps, rotary lobe pumps, or a different suitable pump.

Returning to FIG. 1, the second ink supply pump 117 (which may be peristaltic pump 217 of FIG. 2) is positioned at an elevation that is lower than that of the buffer tank 114. The ink reservoir 118 is positioned at an elevation that is lower than that of the buffer tank 114 and the second ink supply pump 117. With this configuration, gravity helps to pull ink from the buffer tank 114 towards the second ink supply pump 117 and the ink reservoir 118.

In some embodiments, a bypass tube 130 may be attached to the inlets and outlets of second ink supply pump 117, and/or to segments the conduit 111 leading to the inlet and from the output of the second ink supply pump 117. The bypass tube 130 thus provides a path through which ink may flow buffer tank 114 to the ink reservoir 118 that is an alternate (or supplement) to the path that runs through the second ink supply pump 117.

The bypass tube 130, includes, or is connected to, a valve 131. The valve 131 is configured to remain closed during normal operation. When ink is drooled through the printhead 100 to remove air bubbles (discussed in further detail below), the valve 131 may be opened and ink can then freely flow through the bypass tube in a path to the ink reservoir 118 and printhead 100. The bypass tube 130 allows for contaminants such as air bubbles to be removed from the print head, discussed in further detail below.

The ink reservoir is positioned below the nozzles of the printhead to provide a negative pressure 137 which prevents ink from drooling out of the nozzles of the printhead 100 under normal operating conditions. The ink reservoir 118 is additionally attached to a purge pump 122. The purge pump 122 allows for pressure to be placed on the ink in the ink reservoir. This pressure causes ink to flow through the print head, removing contaminants. Additionally, the purge pump 122 may cause initial ink flow from the reservoir 118 to the printhead. The printhead 100 includes ink nozzles that temporarily hold ink before the printhead 100 ejects droplets of ink. The ink is periodically pushed through the nozzles using the purge pump 122 to clear contaminants or dried ink to prepare the nozzles for printing (see FIG. 3).

Figure 3:
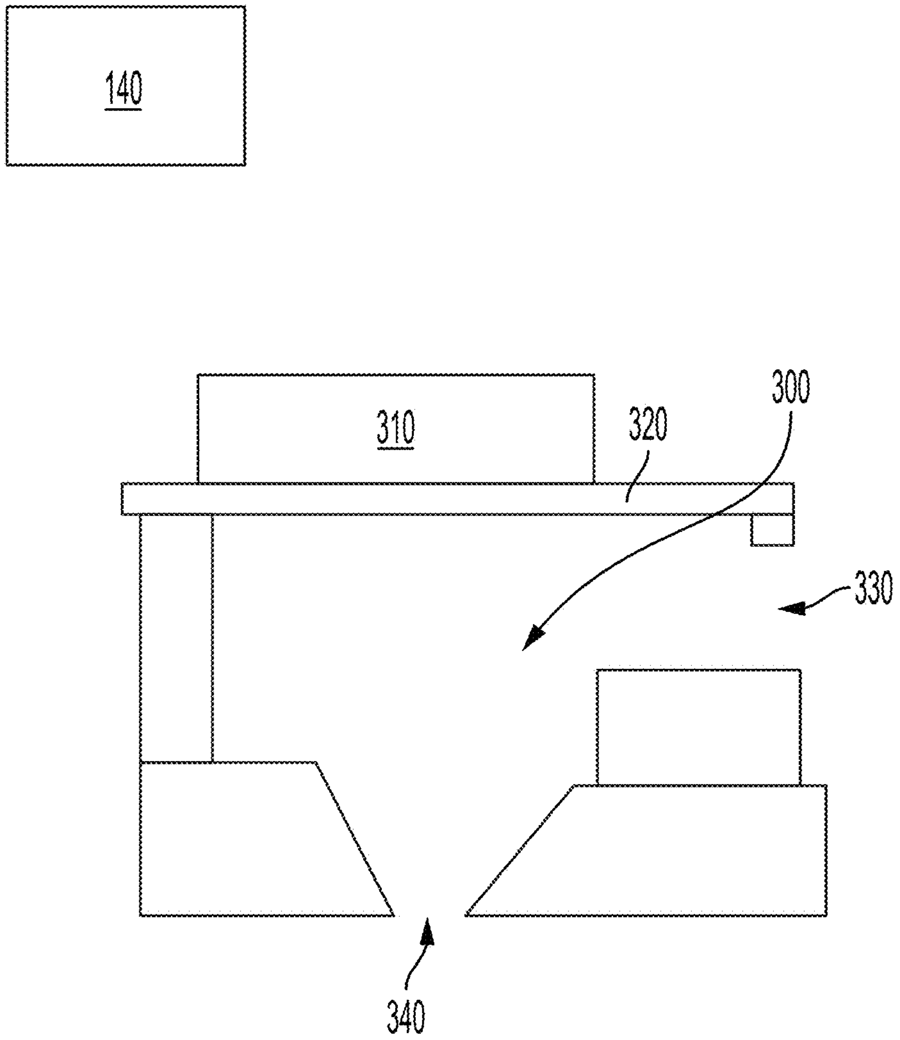
FIG. 3 illustrates elements an ink chamber and nozzle of a printhead that may be used in the marking system of FIG. 1.

In some embodiments, the printhead 100 is a piezoelectric printhead. Referring to FIG. 3, example elements associated with an ink chamber 300 of the printhead 100 are shown. The ink chamber 300 includes one or more piezoelectric elements 310 attached to a diaphragm 320. Ink flows into the chamber at an inlet 330 and out of the chamber through a nozzle 340. The piezoelectric element 310 changes shape or size when an electric current is applied to it. During operation, the control system 140 (which also appeared in FIG. 1) causes a voltage to be applied to the piezoelectric material causing the piezoelectric element 310 to deform. Each cycle of the voltage waveform will cause the piezoelectric material to expand and eject the ink, and then contract to immediately refill the chamber. The deformation causes pressure to build on the diaphragm 320 and within the ink chamber 300. This causes ink, in a controlled and precise manner, to be ejected from the nozzle 340 under a controlled pressure.

Returning to FIG. 1, during a purge cycle, the waste ink is directed into the waste system 120 to allow for storage and proper disposal. The waste system 120 may include a waste tray 128, a waste reservoir 124, a waste bottle 129, and first and second waste transport pumps 126, 127.

The waste tray 128 may be positioned under nozzles of the printhead 100 and serve as an initial collection point of ink and may receive ink during purge cycles or other operations where ink needs to be disposed of. The waste tray 128 is fluidly connected to the waste reservoir 124 and transfers ink thereto via a conduit with assistance from the first waste transport pump 126. Optionally, the waste reservoir 124 also may be additionally connected directly to the printhead 100 via one or more conduits 133. The printhead 100 transfers ink directly to the waste reservoir 124 during a manifold purge. A manifold purge is used to move large volumes of fluid through the print head. This is primarily done to change the fluid type in the printhead, remove air from the ink lines or when debugging a problem that cannot be resolved by a normal purge. The waste reservoir 124 may be fluidly attached to other printheads via the conduits 133. In FIG. 1, two additional conduits 133 are depicted. In some other examples, more or fewer conduits may be fluidly attached to the waste reservoir 124.

The waste reservoir 124 serves as a temporary holding tank and is fluidly attached to the waste bottle 129. The waste bottle 129 receives all the unused, or excess ink from the printer during operation and may be periodically changed or emptied during usage. The ink may be transferred to the waste bottle 129 from the waste reservoir 124 via a conduit with assistance from the second waste transport pump 127. The waste bottle 129 is typically larger than the waste reservoir 124 to reduce the frequency of changing the waste bottle 124.

Due to the complexities of the marking system 10, small contaminants such as air bubbles may enter the system during normal operation. Bubbles can form in printheads from air ingestion, cavitation, temperature changes, or other normal operations. In some cases, removal of the contaminants is possible through standard operation of the purge system 120. In some other cases, additional steps are required to remove contaminants. One method for removal of air includes drooling degassed ink through the ink nozzles. Degassed ink will absorb small amounts of air until saturated. By slowly passing ink by the air bubble, this allows continual availability of degassed ink, thus air absorption continues until the air has been completely absorbed. In some cases, the ink pump 117 needs to be partially disassembled to flush ink through the printhead 100. For example, the ink pump 117 may need to be disassembled (e.g., when the ink pump 117 is configured as a peristaltic pump).

In some methods of the present disclosure, ink may be drooled through the printhead by stopping operation of the second ink supply pump 117 and opening the valve 131 of the bypass tube 130, thereby allowing ink to flow therethrough so as to intentionally overfill the ink reservoir 118 until the surface of its ink volume is higher in elevation than the nozzles of the printhead 100, resulting in ink to drool out of the nozzles in a controlled flow. Additionally, the piezoelectric elements of the printhead 100 may be activated, which improves the efficiency in which the air is absorbed by the degassed ink. The voltage level sent to the piezoelectric elements during this process is a much lower magnitude than that used during normal printing. It creates movement of the ink in the nozzle but does not have enough power to eject the ink. For example, in various embodiments the peak-to-peak voltage for a firing waveform (i.e., normal printing operation) may be approximately 70V, or any voltage in a range from 50V to 96V. In addition, in various embodiments the peak-to-peak voltage applied for a non-firing waveform (i.e. during a drool process) may be approximately 20V, or any voltage in a range from 10V to 30V. The voltage may be applied by two power supplies, one that will apply a positive voltage of approximately 48V to eject ink during normal operation and the other to apply a voltage of approximately −48V causing the piezoelectric elements to flex in the opposite direction and refill the nozzle. In each case, other voltages are possible. If the second ink supply pump 117 is positioned downstream of the filter 116 and degasser 119, the ink passing through the bypass tube 130 and to the printhead 100 is be filtered and degassed.

In some embodiments, the process of drooling degassed ink through the printhead 100 may be triggered by any of various procedures. In some examples, the methods may be automated when air bubbles or contaminants are detected, such as by a pressure sensor generating data that the control system 140 uses to determine that an abnormal pressure in the printhead, such as if the pressure is at least a threshold amount larger than a known normal operating pressure, or the pressure being above a normal operating range. In other examples, the control system 140 may prompt a user to run a drool cycle. In yet other example, a camera may capture an image of content printed on a substrate, the system (or a person) may compare the content to an expected image, determine that a missing nozzle condition exists, and the drool cycle should be triggered if the images are substantially different, if the printed image fails to satisfy a quality requirement.

Optionally, the drooling process described in this document may be implemented after a normal purge process has been run. For example, when a threshold number of nozzles are not functioning properly as determined by the control system, such that the quality of printing is affected, the control system may signal to the user or the system that a purge cycle should be ran, or a purge cycle may be ran through automation. The purge pump and/or other pumps of the system will increase the pressure and flow rate of the ink running through the printhead during the purge operation. If the missing jet condition has not been cleared by the purge system after a threshold period of time, or after a threshold number of purge cycles have been run, the system may implement the drool procedure described in this document, where the valve 131 is opened allowing ink to flow through the bypass tube 130 and slowly through the system and thus can be said to drool through the printhead nozzles. In addition, in some embodiments the system may alternate cycles in which one or more purge procedures are run, then one or more drool procedures. The cycles may continue for a set number of cycles, for a set period of time, or until the missing jet condition is resolved.

Figure 4:
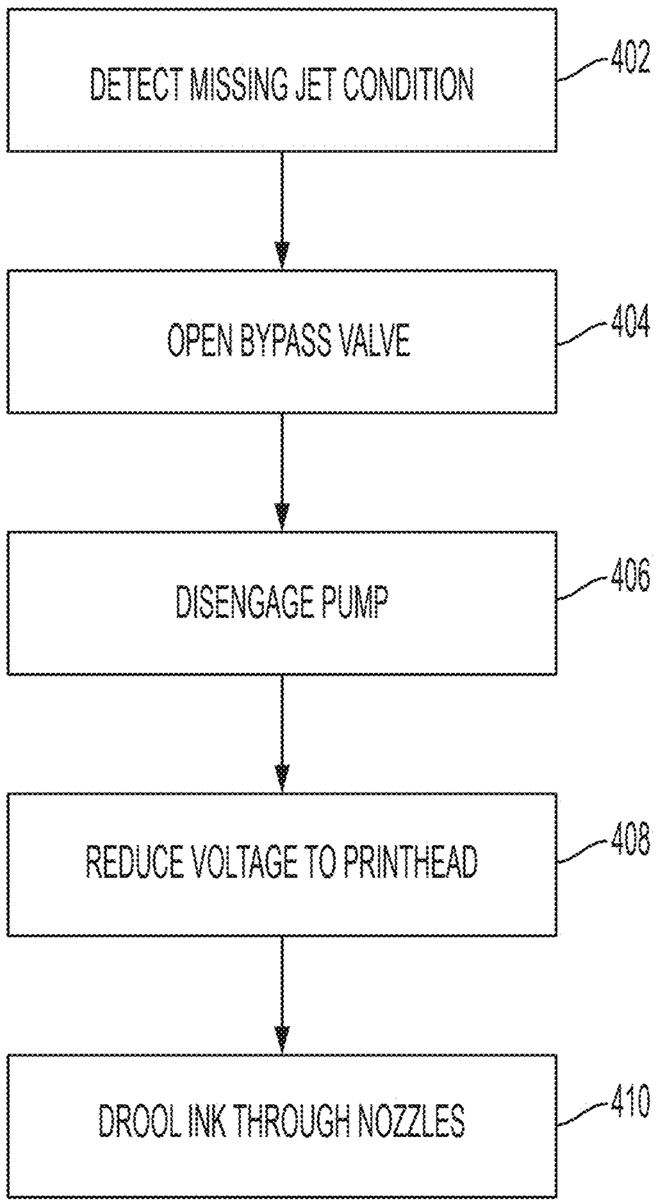
FIG. 4 is a flowchart outlining a method of clearing contaminants such as air bubbles from a printhead in accordance with the principles of the present disclosure.

With reference to FIG. 4, a flowchart depicts operations, executed by the control system, during a drool protocol that to drools degassed ink through the printhead assembly to remove contaminants. At 402 the marking system 10 may detect a missing nozzle condition. Detection of the missing nozzle condition may occur by the control system 140 in response to a missing jet measurement and trigger a drool protocol. For example, the missing jet measurement may be accomplished by causing the marking system 10 to print a document and measuring the number of nozzles that are missing as discussed above. If the number of missing nozzles is above a threshold number, the system may prompt a user to trigger the drool protocol or automatically trigger the drool protocol.

Optionally, other conditions can trigger the drool protocol at step 402. For example, the control system may be programmed to trigger a purge protocol automatically upon the system reaching a threshold operational condition, such as when the printhead has printed a threshold number of sheets since the last drool, when the printhead has consumed a threshold amount of ink since the last drool, or detection of other faults in the system. After the standard purge is completed one or more times, the system may then initiate the drool procedure at 402 if the missing jet condition has not yet resolved. In other embodiments, activating the protocol may comprise generating a visual and/or audible prompt that invites a user to manually start the drool protocol. In other examples, the drool protocol may be started manually by an operator. For example, the drool protocol may be initiated by the operator in response to system faults or issues identified by the operator.

To begin, once the drool protocol has been triggered at 402, the bypass valve 131 is opened at 404. As discussed above, opening the bypass valve 404 allows for ink to flow from the buffer tank directly through the bypass tube 130 and into the ink reservoir 118. To prevent ink from continuing to flow through the ink supply pump 117, the ink supply pump 117 is disabled at 406. As discussed above, the ink supply pump 117 may be a peristaltic pump which acts as a stop when disabled, thereby blocking ink from flowing through ink supply pump 117 and causing the ink to flow through the bypass tube 130.

Once through the bypass tube 130, degassed ink then flows through the fluid supply system to the printhead 100 as a result of an increase in hydrostatic pressure to the ink reservoir 118 caused by ink flowing from the buffer tank 114 and increasing the level of ink within the ink reservoir 118. The pressure of ink to the printhead 100 is measured by the control system 140 through the bypass tube 130 and the nozzles of the printhead 100. When the control system detects that the pressure is positive and greater than a threshold voltage within the printhead is reduced at 408. The piezoelectric elements are vibrated by applying the low voltage as described above. This process allows for degassed ink to drool through the nozzles of the printhead 100 at 410 and absorb air bubbles that may be causing issues or clogs.

In summary, the present disclosure is related to removing contaminants such as air bubbles from marking systems in a time and cost-effective manner, The disclosure provides a marking system that includes a printhead. The printhead includes a plurality of nozzles configured to eject ink. The marking system additionally includes a fluid supply system configured to supply the ink to the printhead. The fluid supply system includes an ink pump that is fluidly connected to one or more conduit segments and configured to transport the ink toward the printhead via the one or more conduit segments. The fluid supply system additionally includes a bypass tube that is fluidly coupled to an inlet of the ink pump and an outlet of the ink pump and a valve that is connected to the bypass tube and configured to transport ink through the bypass tube when open, and not transport ink through the bypass tube when closed. The marking system includes a control system configured to open the valve to transport the ink through the bypass tube instead of the ink pump in response to detection of a missing nozzle condition in the printhead and allow the ink to drool through the nozzles of the printhead and absorb air bubbles as the ink drools.

In some embodiments, the fluid supply system additionally includes a degasser positioned to degas the ink before passing the ink to the ink pump, an ink reservoir positioned to receive the ink from the ink pump and/or the bypass tube, and a purge pump fluidly coupled to the ink reservoir and configured to provide pressure through the system during a purge protocol.

In some embodiments, the ink reservoir is below a buffer tank that is configured to store ink for the fluid supply system such that the ink will flow through the bypass tube via gravitational force when the valve is open.

In some embodiments, the ink pump is a peristaltic pump that is configured to draw the ink therethrough via vacuum pressure and act as a stop when not in use.

In some embodiments, the control system is electronically coupled to a sensor that is configured to detect whether the plurality of nozzles are operating properly.

In some embodiments, the missing nozzle condition comprises determining that a number of missing nozzles on a document printed by the marking system is greater than a threshold number of missing nozzles.

In some embodiments, the plurality of nozzles are piezoelectric elements that are configured to vibrate when the valve of the bypass tube is opened and pressure in the printhead is positive and above a threshold.

In some embodiments, the control system is configured to vibrate the piezoelectric elements by sending a voltage therethrough that is lower than a voltage sent therethrough during a printing operation.

In some embodiments, the marking system further includes a plurality of ink pumps that are configured to work with various ink colors, wherein each of the plurality of ink pumps is provided with a corresponding bypass tube.

The present disclosure additionally relates to a method of removing gas from ink delivered to a printhead. The method includes providing a marking system. The marking system includes a printhead, a control system, and a fluid supply system. The fluid supply system includes an ink pump fluidly connected to one or more conduit segments and configured to transport the ink toward the printhead via the one or more conduit segments. The fluid supply system additionally includes a bypass tube fluidly coupled to an inlet of the ink pump and an outlet of the ink pump, and a valve that is connected to the bypass tube and configured to transport ink through the bypass tube when open, and not transport ink through the bypass tube when closed. The control system, in response to the control system detecting a missing nozzle condition in the printhead or by receiving a command from an operator, causes the valve to open. Opening the valve allows the ink to pass through the bypass tube and the ink to drool through the nozzles of the printhead and absorb air bubbles as the ink drools In some embodiments, the plurality of nozzles are piezoelectric elements and allowing the ink to drool through the nozzles includes causing the piezoelectric elements to vibrate in response to the control system detects that pressure within the printhead is positive and above a threshold.

In some embodiments, causing the piezoelectric elements to vibrate includes applying a voltage to the piezoelectric elements that is lower than a voltage applied to the piezoelectric elements during a normal printing operation.

In some embodiments, the ink pump is positioned below a buffer tank that is configured to store ink provided to the fluid supply system and the ink flows through the bypass tube by gravity when the valve is open.

In some embodiments, the voltage applied when causing the piezoelectric elements to vibrate is a peak-to-peak voltage of approximately 10 volts to approximately 30 volts.

In some embodiments, detecting the missing nozzle condition includes detecting that at least a threshold amount of the plurality of nozzles are not operating properly.

In some embodiments, detecting the missing nozzle condition includes measuring a number of missing nozzles on a document printed by the marking system and determining whether the number of missing nozzles meets a threshold number of missing nozzles measure.

In some embodiments, causing the valve to open includes sending a message to an operator that a cycle of opening the valve should be completed.

In some embodiments, the control system reduces voltage to the plurality of nozzles while ink drools through the plurality of nozzles.

The term "approximately," when used in connection with a numeric value, is intended to include values that are close to, but not exactly, the number. For example, in various embodiments, the term "approximately" may include values that are within +/−1% of the value, +/−5% of the value, +/−10 percent of the value, or any value or fraction thereof between any or all of the values. The term "substantially," when used in connection with a numeric value, is intended to mean approximately, within a threshold tolerance that is a percentage corresponding to any of the percentages described in the previous sentence.

This disclosure is not limited to the particular systems, methodologies or protocols described, as these may vary. The terminology used in this description is for the purpose of describing the particular versions or embodiments only and is not intended to limit the scope. It will be understood that terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes.

The term "substantially" may be used herein to emphasize this meaning, unless the context or other statements clearly indicate otherwise. For example, items described as "substantially the same," "substantially equal," or "substantially planar," may be exactly the same, equal, or planar, or may be the same, equal, or planar within acceptable variations that may occur, for example, due to manufacturing processes and/or tolerances. The term "substantially" may be used to encompass this meaning, especially when such variations do not materially alter functionality.

It will be understood that various modifications may be made to the embodiments disclosed in this document. Likewise, the above disclosed methods may be performed according to an alternate sequence. Therefore, the above description should not be construed as limiting, but merely as examples of the various embodiments. Those skilled in the art will envision other modifications within the scope and spirit of the claims appended to this document.

The invention claimed is:

1. A marking system, comprising:

a printhead comprising a plurality of nozzles configured to eject ink; and a fluid supply system configured to supply the ink to the printhead, the fluid supply system comprising:

an ink pump fluidly connected to one or more conduit segments and configured to transport the ink toward the printhead via the one or more conduit segments, a bypass tube fluidly coupled to an inlet of the ink pump and an outlet of the ink pump, a valve that is connected to the bypass tube and configured to transport ink through the bypass tube when open, and not transport ink through the bypass tube when closed; and a control system configured to:

open the valve to transport the ink through the bypass tube instead of the ink pump in response to detection of a missing nozzle condition in the printhead; and allow the ink to drool through the nozzles of the printhead and absorb air bubbles as the ink drools.

2. The marking system of claim 1, further comprising, in the fluid supply system:

a degasser positioned to degas the ink before passing the ink to the ink pump;

an ink reservoir positioned to receive the ink from the ink pump and/or the bypass tube; and a purge pump fluidly coupled to the ink reservoir and configured to provide pressure through the system during a purge protocol.

3. The marking system of claim 2, wherein the ink reservoir is below a buffer tank that is configured to store ink for the fluid supply system such that the ink will flow through the bypass tube via gravitational force when the valve is open.

4. The marking system of claim 1, wherein the ink pump comprises a peristaltic pump that is configured to draw the ink therethrough via vacuum pressure and act as a stop when not in use.

5. The marking system of claim 1, wherein the control system is electronically coupled to a sensor that is configured to detect whether the plurality of nozzles are operating properly.

6. The marking system of claim 1, wherein the missing nozzle condition comprises determining a number of missing nozzles of a document printed by the marking system and determining that the number of missing nozzles is greater than a threshold number of missing nozzles.

7. The marking system of claim 1, wherein the plurality of nozzles comprise piezoelectric elements that are configured to vibrate when the valve of the bypass tube is opened and pressure in the printhead is positive and above a threshold.

8. The marking system of claim 7, wherein the control system is configured to vibrate the piezoelectric elements by sending a voltage therethrough that is lower than a voltage sent therethrough during a printing operation.

9. The marking system of claim 1, further comprising a plurality of ink pumps that are configured to work with various ink colors, wherein each of the plurality of ink pumps is provided with a corresponding bypass tube.

10. A method of removing gas from a printhead, the method comprising:

providing a marking system comprising:

a printhead, a control system, and a fluid supply system comprising:

an ink pump fluidly connected to one or more conduit segments and configured to transport the ink toward the printhead via the one or more conduit segments, a bypass tube fluidly coupled to an inlet of the ink pump and an outlet of the ink pump, and a valve that is connected to the bypass tube and configured to transport ink through the bypass tube when open, and not transport ink through the bypass tube when closed; and by the control system, in response to the control system detecting a missing nozzle condition in the printhead or by receiving a command from an operator:

causing the valve to open, thus allowing the ink to pass through the bypass tube, and allow the ink to drool through the nozzles of the printhead and absorb air bubbles as the ink drools.

11. The method of claim 10, wherein:

the plurality of nozzles comprise piezoelectric elements; and allowing the ink to drool through the nozzles comprises causing the piezoelectric elements to vibrate in response to the control system detects that pressure within the printhead is positive and above a threshold.

12. The method of claim 11, wherein causing the piezoelectric elements to vibrate comprises applying a voltage to the piezoelectric elements that is lower than a voltage applied to the piezoelectric elements during a normal printing operation.

13. The method of claim 11, wherein the voltage applied when causing the piezoelectric elements to vibrate is a peak-to-peak voltage of approximately 10 volts to approximately 30 volts.

14. The method of claim 10, wherein the ink pump is positioned below a buffer tank configured to supply ink to the fluid supply system and the ink flows through the bypass tube by gravity when the valve is open.

15. The method of claim 10, wherein detecting the missing nozzle condition comprises detecting that at least a threshold amount of the plurality of nozzles are not operating properly.

16. The method of claim 10, wherein detecting the missing nozzle condition comprises measuring a number of missing nozzles on a document printed by the marking system and determining whether the number of missing nozzles meets a threshold number of missing nozzles.

17. The method of claim 10, wherein causing the valve to open comprises sending a message to an operator that a cycle of opening the valve should be completed.

18. The method of claim 10, further comprising, by the control system, reducing voltage to the plurality of nozzles.

* * * * *